United States Patent
Tsay et al.

(10) Patent No.: US 9,337,915 B2
(45) Date of Patent: May 10, 2016

(54) OUTDOOR WIRELESS MODEM AND SIGNAL PROCESSING METHOD THEREOF

(71) Applicant: ARCADYAN TECHNOLOGY CORPORATION, Hsinchu (TW)

(72) Inventors: Wen-Jiunn Tsay, Hsin-Chu (TW); Chien-Lin Chen, Taipei (TW); Gwo-Liang Chen, Hsinchu (TW); Guan-De Liou, Hsinchu (TW); Jen-Hsiang Fang, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/829,701

(22) Filed: Aug. 19, 2015

(65) Prior Publication Data

US 2015/0358068 A1    Dec. 10, 2015

(51) Int. Cl.
| | | |
|---|---|---|
| *H04B 7/26* | (2006.01) | |
| *H04B 7/155* | (2006.01) | |
| *H04L 12/28* | (2006.01) | |
| *H04W 24/02* | (2009.01) | |
| *H04L 12/709* | (2013.01) | |
| *H04L 25/02* | (2006.01) | |
| *H04W 84/04* | (2009.01) | |
| *H04W 84/14* | (2009.01) | |

(52) U.S. Cl.
CPC .............. *H04B 7/15507* (2013.01); *H04B 7/26* (2013.01); *H04L 12/2834* (2013.01); *H04W 24/02* (2013.01); *H04L 25/026* (2013.01); *H04L 45/245* (2013.01); *H04L 2012/2841* (2013.01); *H04W 84/047* (2013.01); *H04W 84/14* (2013.01)

(58) Field of Classification Search
None
See application file for complete search history.

(56) References Cited

U.S. PATENT DOCUMENTS

| | | | | |
|---|---|---|---|---|
| 2002/0025778 A1* | 2/2002 | Lee | ........................ | H04W 88/06 455/3.05 |
| 2008/0192696 A1* | 8/2008 | Sachs | .................... | H04W 36/02 370/331 |
| 2012/0057462 A1* | 3/2012 | Kotecha | .............. | H04L 47/2466 370/236 |
| 2013/0045770 A1* | 2/2013 | Aschan | ............. | H04W 52/0216 455/522 |

* cited by examiner

*Primary Examiner* — Hoon J Chung
(74) *Attorney, Agent, or Firm* — Li & Cai Intellectual Property (USA) Office

(57) ABSTRACT

Disclosure herein is related to an outdoor wireless modem and a signal processing method thereof. The outdoor wireless modem is particularly disposed in the midst of and bridging a local-area network and a wide-area network established by a mobile communication network. One of the objectives of the invention is to provide a solution replacing the present last mile connection. According to one of the embodiments, main circuit of the outdoor wireless modem includes a radio-frequency module and a baseband module. The baseband module includes at least two processing circuits for respectively processing the signals over the mobile communication network and the packets over the local-area network. The processing circuits are packaged into one module according to the design. Further in one embodiment, a bandwidth integration unit is introduced to the modem. The bandwidth integration unit serves to achieve load balance and bandwidth integration.

12 Claims, 9 Drawing Sheets

OUTDOOR WIRELESS MODEM AND SIGNAL PROCESSING METHOD THEREOF

CROSS-REFERENCE TO RELATED APPLICATION

This claims the benefit under 35 U.S.C. §120 of U.S. application Ser. No. 13/872,107, entitled "OUTDOOR WIRELESS MODEM AND SIGNAL PROCESSING METHOD THEREOF," filed Apr. 27, 2013, which is hereby incorporated by reference.

BACKGROUND OF THE INVENTION

1. Field of the Invention

The present invention relates to an outdoor wireless modem and a signal processing method, in particular, to the outdoor wireless modem having a first processor rendering mobile communication over a backbone network and a second processor handling the packets over a local-area network.

2. Description of Related Art

Home-installed network modem serves the well-known way allowing the consumer to connect to Internet. For example, an ADSL (Asymmetric Digital Subscriber Line) is provided with the modem for connecting to Internet over a telecommunication room. The so-called "last mile connection" means a connection established from the exchange of telecommunication operator to the client-end modem. This kind of network backbone or the "last mile" connection is over a cable network.

The mentioned client-end modem is preferably a network device installed at indoor room. The modem is served to convert the network data over the last mile connection to the digital signals for the consumer facility. Alternatively, the modem also converts data from the client's computer to the analogic signals over the cable. The analogic signals are transferred to a destination through the telecommunication operator. In general, the network modem serves to establish connection to external device over an RJ-11 standard cable; further use RJ-45 standard cable to render a local-area network for the end users.

Reference is made to FIG. 1 which illustrates a schematic diagram of a conventional modem.

A telecommunication room 10 and some terminal devices at home 14 are shown. The terminal devices are such as the shown computer devices 141, 143, for example the mobile devices and computers. The computer devices 141, 143 are capable of network connection. Via a network sharing device 147, the devices 141, 143 are allowed to connect with a network modem 145. Further, via the network modem 145, the devices 141, 143 connect to Internet 12 through the telecommunication room 10. In practice, over a telephone cable, the so-called "last mile", the network modem 145 at home 14 is connected to the telecommunication room 10.

FIG. 2 shows a schematic diagram of a conventional wireless modem. A shown indoor wireless modem is provided to internally integrate an LTE (Long Term Evolution, the fourth generation mobile communication) module and a wireless local-area network, for example the WiFi™.

The wireless modem 20 is preferably a network device capable of packet routing. As shown in the diagram, a packet routing circuit 201 is provided to process the signals between the LTE module 203 and WiFi module 205. According to the information of source and destination carried in the packet, the modem 20 conducts the packet routing.

The LTE module 203 and the WiFi module 205 are two separate wireless signal circuits in compliance with different communication protocols. This LTE module 203 is enabled to receive or transmit the signals over fourth generation mobile communication network, such as LTE over an LTE antenna 204. The LTE communication protocol is one of the solutions to implement the mobile communication network. Further, the WiFi module 205 conducts receiving or transmitting the wireless network signals over a WiFi antenna 206. Compared to the LTE protocol, the WiFi communication technology is suitable to serve the local area network.

The wireless modem 20 is used to handle signaling over the two different communication protocols by a packet routing circuit 201. Specifically, it's easily to make electric interference since two or more radio processing circuits are simultaneously installed into this device.

SUMMARY OF THE INVENTION

Disclosure is related to an outdoor wireless modem and a signal process method thereof. One major objective is to provide a wireless modem installed over a local-area network and a wide-area network backbone over a mobile communication network. The aspect of the present invention provides a solution to replace the traditional wired network which constitutes the "Last Mile" connection to the network backbone. The invention allows a user to get on Internet using his device connected to the local-area network through the mobile communication network.

In accordance with the present invention, one of the objectives of the outdoor wireless modem is to bridge a wide-area network backbone and a local-area network. The major circuit of the outdoor wireless modem includes a radio-frequency (RF) module and a baseband module. The radio-frequency module is responsible to receive external wireless signals or transmit the signals by the radio-frequency module to the mobile communication network via an antenna. It is preferred that the antenna may be a directional antenna or an array antenna. The baseband module includes at least two processing units that respectively process the signals over the mobile communication network and the local-area network. In practice, the two circuit units are packaged into one module.

According to one of the embodiments, the processing circuits in the baseband module include a first processing unit and a second processing unit. The first processing unit is as a processor used to process the signals externally over the mobile communication network. The first processing unit receives the data packets of local-area network sent from the second processing unit. The first processing unit converts the packets to the signals suitably over the mobile communication network. The baseband module is connected with a local-area network interfacing module that is as the ports for forwarding the packets over the network.

The first processing unit is primarily used to handle the wireless network signals processed by the radio-frequency module, especially the signals over the fourth mobile communication network. The second processing unit, besides the data packets over the local-area network, is as the processor for operating the operating system of the whole modem system.

The embodiment of the method applied to the outdoor wireless modem includes receiving the wireless signals, for example the mobile communication signals, via an antenna, and the baseband module carrying the signals after preprocess made by the radio-frequency module.

The baseband module is responsible to perform the conversion of the received wireless signals. In which, the first processing unit conducts the signal conversion in compliance with a specific wireless communication protocol. After that, the operating system of the outdoor wireless modem performs analog-to-digital conversion, for example it's to convert the electric signals from the radio waves to the digital signals. The second processing unit then converts the signals to the data packets delivered over the LAN.

In one more embodiment, the outdoor wireless modem is a main device that includes a bandwidth integration unit for linking with the other one outdoor wireless modem. The bandwidth integration unit is used to dispense the data forwarded to the two different outdoor wireless modems as receiving the data packets from the local-area network. The bandwidth integration unit achieves load balance. Further, if the modem receives the signals transmitted from a remote device over the mobile communication network, the signals will be received by the outdoor wireless modems, the bandwidth integration unit may reassemble the signals for the purpose of bandwidth integration.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The "Last Mile connection" defines the network segment between the telecommunication room of an Internet Service Provider (ISP) and the network made by home telephone line. The connection of the "Last Mile" is built especially by cable or optical fiber. When the fourth generation mobile communication technology comes, the network backbone is possible to be built by this mobile communication network. The outdoor wireless modem and the related signal processing method of the present invention are disclosed.

The outdoor wireless modem renders a solution of bridging the mobile communication network and the local-area network. This modem device, in an exemplary example, includes a first processor for processing the wireless signals over the mobile communication network and the other second processor for processing the data over the local-area network. The modem also facilitates bandwidth integration through the same framework.

The outdoor wireless modem and the related signal processing method introduces a simplified framework for easily operating maintenance and replacement of internal circuit module. The simplification of framework is able to reduce probability of failure, and effectively prevent signal interference.

Figure 1:
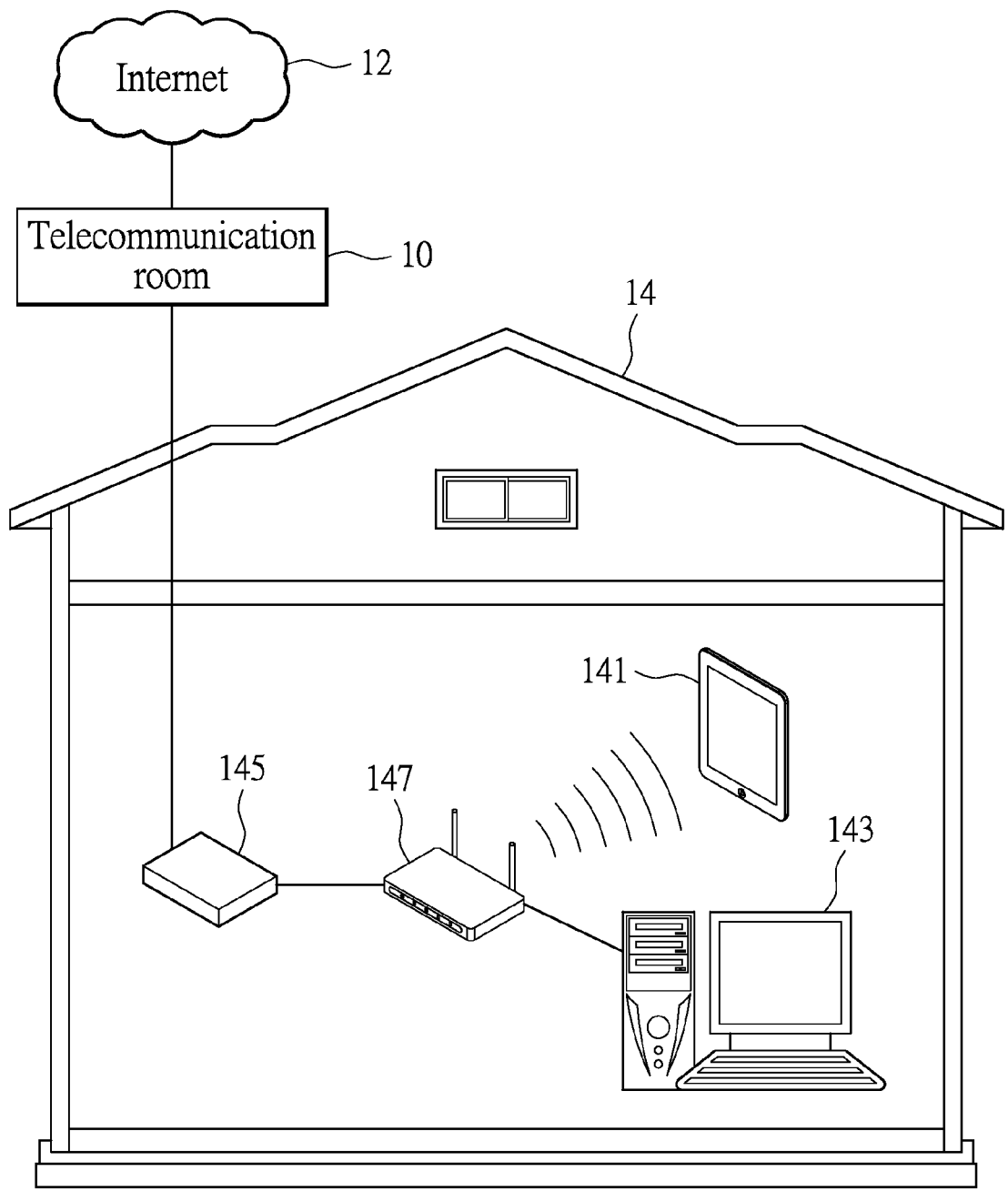
FIG. 1 shows a schematic diagram in use of a conventional modem.
Figure 2:
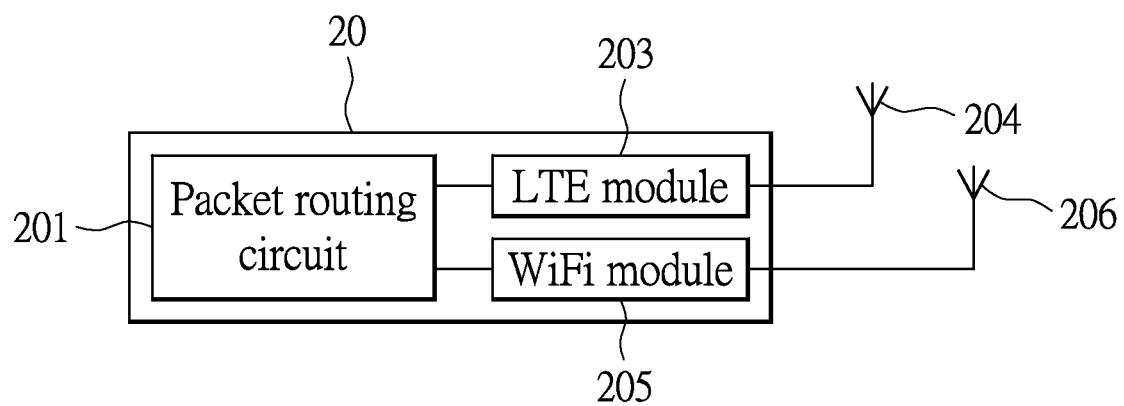
FIG. 2 is a schematic diagram of a wireless modem in a conventional technology.
Figure 3:
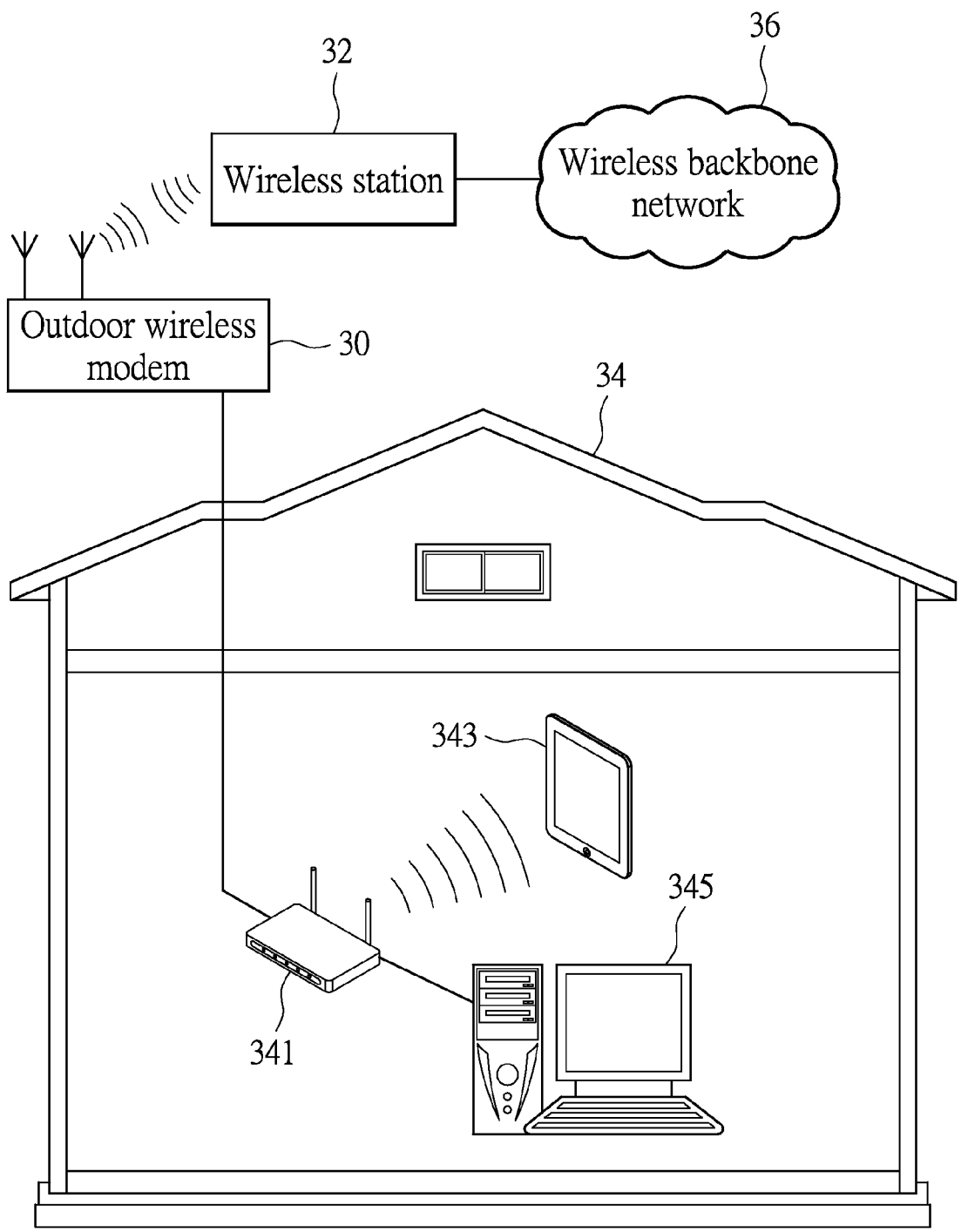
FIG. 3 is a schematic diagram illustrating the state of using an outdoor wireless modem in one embodiment of the present invention.

Reference is made to FIG. 3 describing one of the embodiments of the outdoor wireless modem according to the present invention.

The outdoor wireless modem 30 is such as a gateway device preferably designed to be installed at outside of the building 34, but also inside in some embodiments. The gateway device is used to bridge the local-area network and external wireless network. As shown in the diagram, in the building 34, a network sharing device 341 such as a router is provided for sharing network connections to the internal devices and therefore establishing a local-area network. The network sharing device 341 allows forwarding signals generated by the network-connected computer devices 343, 345 in the LAN to outside; on the contrary, the external signals can be converted and forwarded by the network sharing device 341 to the local-area network.

Inside the outdoor wireless modem 30, a connector such as RJ-45 standard network connector is prepared. The modem 30 is connected with the network sharing device 341 via the RJ-45 cable. This network sharing device 341 is used to manage the connections of the computer devices 343, 345, and also served as a gateway to the external network. In practice, a network sharing mechanism is made by this network sharing device 341 for the computer devices 343, 345, especially the computer devices 343, 345 is allowed to wired or wirelessly link the external network through the outdoor wireless modem 30.

The outdoor wireless modem 30 establishes a connection to the wireless station 32 over a wireless communication. It is preferred that the fourth generation mobile communication technology such as LTE or WiMAX (Worldwide Interoperability for Microwave Access) is introduced to establishing the connection. Via the wireless station 32, the modem 30 is connected to the network backbone which is established over the fourth generation communication technology. In the shown example, the network framework allows the end user to surf Internet over a wireless backbone network 36, therefore the wireless communication technology replaces the traditional scheme of Last mile connection.

Reference is made to FIG. 3 describing one embodiment of 的 the present invention. The computer devices 343, 345 set up in the local-area network in the building 34 are connected to the wireless backbone network 36 via the shown network sharing device 341, outdoor wireless modem 30, and wireless station 32. The wireless backbone network 36 is especially constituted by the wireless communication technology. In one further embodiment, the embodiment implementing the local-area network may not be limited to the shown type, but may be implemented by the various types of network frameworks. More particularly, the outdoor wireless modem 30 is functioned to be a gateway or/and router for serving a specific local-area network linked to the wireless backbone network 36.

Figure 4:
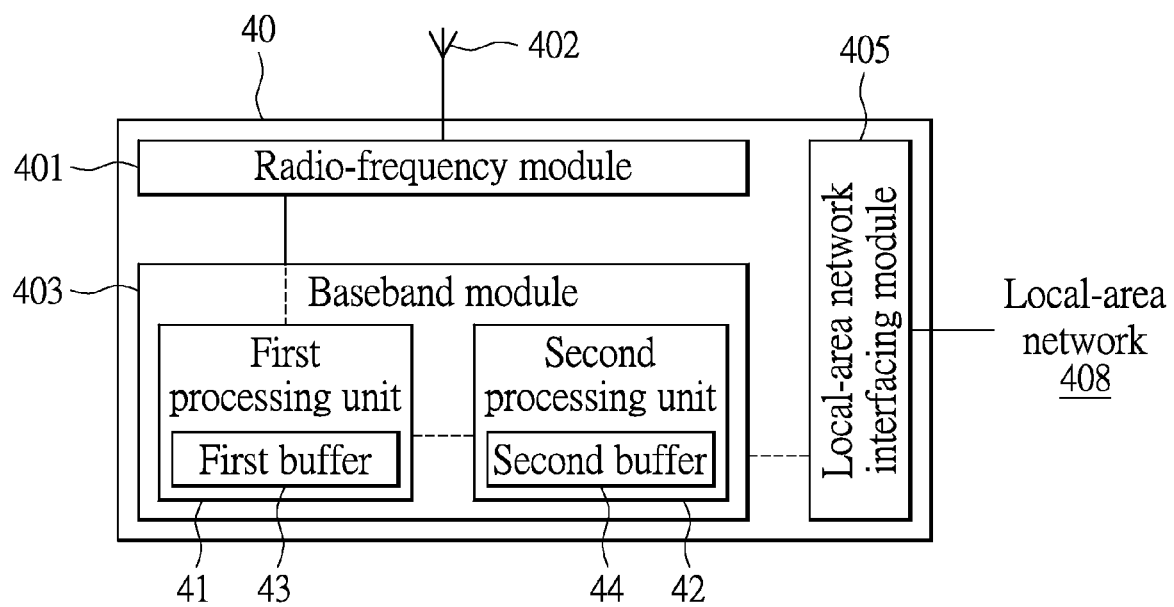
FIG. 4 shows one of the circuit blocks describing the outdoor wireless modem in one embodiment of the present invention.

FIG. 4 schematically shows the circuit blocks implementing one of the embodiments of the outdoor wireless modem.

In an exemplary embodiment, the main circuits of the outdoor wireless modem 40 include a radio-frequency (RF) module 401 and a baseband module 403. The radio-frequency module 401 connects to an antenna 402, by which receiving the external wireless signals or transmitting the mobile communication signals via the radio-frequency module 401.

The baseband module 403 handles the signals and the related encoding/decoding procedure under a specified wireless communication protocol. The baseband module 403 creates a communication channel, and filters out the signals not under the supported wireless communication protocol. According to one of the embodiments of the present invention, the baseband module is enabled to convert the signals from the local-area network to the wireless communication signals, further modulate the carrier waves with specified frequency in accordance with the supported communication protocol. The signals are then sent via the antenna. The antenna is preferably a directional antenna or array antenna. It is worth noting that the signal frequency for the baseband module can be changed by the modulation technology, in which the related parameters such as amplitude, frequency, and phase are modulated as required.

In the current example, the baseband module 403 includes at least two processing units which respectively process the signals over the mobile communication network and the data packets over the local-area network. The circuits of the two processing units are packaged in one package. For example, the units are shown as a first processing unit 41 and a second processing unit 42. The first processing unit 41 also has a first buffer 43 which is for buffering the wireless signals exchanged with the second processing unit 42. The second processing unit 42 has a second buffer 44 which is for use of signal buffer.

Furthermore, the baseband module 403 is connected to a local-area network interfacing module 405 over an inner connection. This local-area network interfacing module 405 is exemplarily a circuit module of Physical Layer which is in charge of port management and packets forwarding for the local-area network. The outdoor wireless modem 40 is connected to the local-area network 408 via this local-area network interfacing module 405. For example, the local-area network interfacing module 405 serves RJ-45 standard cables for the devices in the local-area network 408. Further, the cable format of RJ-11 or HomePlug cable may also implement the wired connections.

FIG. 4 shows a schematic diagram of the embodiment of the present invention. The outdoor wireless modem 40 connects to the external mobile communication network via the antenna 402, and to the local-area network via the local-area network interfacing module 405. The radio-frequency module 401 conducts the fourth mobile communication protocol to constitute a wide-area wireless backbone network. An RF transmitter (not shown) and an RF receiver (not shown) are included in the radio-frequency module 401. The radio-frequency module 401 is designed to filter out the signals other than the supported communication protocol(s) for the following modulating tasks. The radio-frequency module 401 conducts the transmittal with the corresponding antenna 402.

The baseband module 403 is electrically connected to the radio-frequency module 401. The baseband module 403 is one of the circuits of the outdoor wireless modem 40 and used to process the signals over the radio-frequency module 401.

The baseband module 403 is also the circuit for bridging the local-area network interfacing module 405 and the radio-frequency module 401. Over an uplink route, the packets from the local-area network are converted to the signals delivered over the wireless network which corresponding communication protocol. Alternatively, over a downlink route, the signals over the wireless network are converted to the data packets sent over the local-area network.

The first processing unit 41 is primarily used to conduct the wireless signals, such as fourth generation mobile communication network, to the radio-frequency module 401. The first processing unit 41 also performs modulation and signal encoding/decoding with the corresponding mobile communication protocol. The first processing unit 41 further controls the operation of the radio-frequency module 401 in order to conduct the signal transmission. For the modulation, the baseband module 403 is used to modulate the frequency of the signals, including applying the amplitude, frequency, or/and phase over the supported mobile communication protocol. A first buffer 43 for buffering the signals is included in the first processing unit 41.

When the first processing unit 41 performs conversion of the wireless network signals, for example the analog radio waves via the antenna 402. To co-operate with operating system of the outdoor wireless modem 40, the first processing unit 41 performs the conversion of the radio waves into the digital signals over the local-area network. The second processing unit 42 is such as a data processor of the outdoor wireless modem 40. When booting the outdoor wireless modem 40, the second processing unit 42 is as the processor executing the operating system, and handling the instructions and signals made by the operating system. This outdoor wireless modem 40 uses this second processing unit 42 to operate the local-area network.

Figure 5:
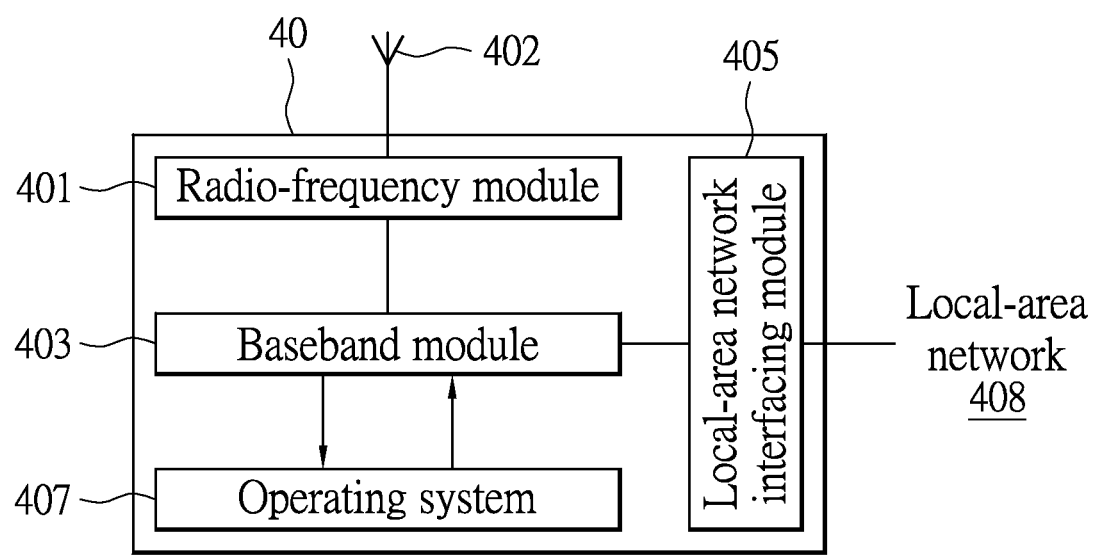
FIG. 5 shows a second example of the circuit block describing the outdoor wireless modem in one further embodiment of the present invention.

Reference is made to FIG. 5 showing a diagram with the circuit blocks illustrating the outdoor wireless modem of the present invention. The outdoor wireless modem 40 is disposed with a radio-frequency module 401, a baseband module 403, and an operating system 407 for operating the modem. In which the baseband module 403 is used to bridge the radio-frequency module 401 and the circuit of a local-area network interfacing module 405. That is, the baseband module 403 conducts the data packets over the local-area network 408 and also the wireless radio signals over the external wireless network via antenna 402.

In the current example, the programs of the operating system 407 are stored in the memory of the modem 40. As initiating the outdoor wireless modem 40, the operating system 407 is activated for operating the modem 40. The operating system 407 also initiates applications for rendering some functions for the modem 40, for example the operations including signal conversion, packets routing, circuit control, and the like.

Figure 6:
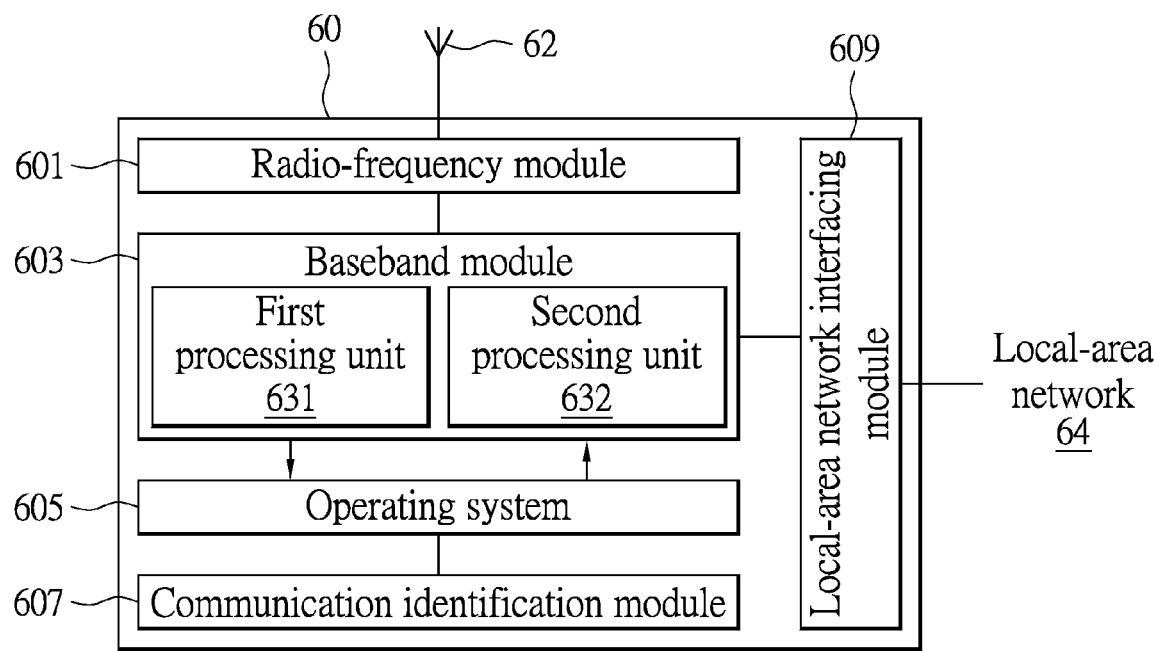
FIG. 6 shows a third example of the circuit block of the outdoor wireless modem in one embodiment of the present invention.

FIG. 6 shows a circuit block illustrating the outdoor wireless modem in one further embodiment of the present invention.

The main circuits of the outdoor wireless modem 60 has a antenna 62 for bridging the external wireless network. The modem 60 includes a radio-frequency module 601 for processing the signals under a format of the fourth generation mobile communication protocol. This radio-frequency module 601 is electrically connected to a baseband module 603. The baseband module 603 includes a first processing unit 631 and a second processing unit 632. Further, the outdoor wireless modem 60 has a memory for storing the programs of operating system 605 and some other software. The operating system 605 can be activated while the modem 60 boots up.

The booting procedure may simultaneously initialize a communication identification module 607 and a local-area network interfacing module 609 which renders a connecting interface for signaling the local-area network 64.

The described outdoor wireless modem 60 is as a main device allowing the local devices bridging the fourth generation mobile communication network. According to the current technology, the modem 60 may have a communication identification module 607 which is used to identify the subscriber, such as the known subscriber identity module (SIM) adopted by the mobile device. The communication identification module 607 is electrically connected to the processor of the modem 60. The communication identification module 607 is actually a smart card including a microprocessor and a memory. This smart card is capable of recoding user data. The user data is for the mobile device to identify the user who uses the mobile device. Further, the identified user data may initiate the function of wireless communication of the modem. The user data may also be the basis to recognize the device when it roams around the different areas. When the user needs to get on Internet over the mobile communication network, this identification module 607 is as an interface in charge of bridging the network. The outdoor wireless modem 60 of the present invention is required to load the communication identification module 607 as it initiates a connection to the mobile communication network. This module 607 allows the telecommunication operator to recognize the device and accordingly to provide the permission to link network.

The operating system 605 will initialize a communication identification module 607 as initiating the modem 60. The operating system 605 may operate this communication identification module 607 to convey the recorded subscriber's identification to an Internet service provider (ISP) such as the telecommunication company. After identifying and authenticating the subscriber on the modem 60 by this communication identification module 607, the communication function such as the fourth generation communication network for the modem 60 will be activated. The communication identification module 607 according to one of the embodiments is as, but not limited to, the SIM (subscriber identity module) card for the ISP to identify the subscriber.

That means, the initializing process of the outdoor wireless modem 60 includes initiating the wireless communication module having the baseband module 603, radio-frequency module 601 and antenna 62. The operating system 605 simultaneously initiates the communication identification module 607 to retrieve the subscriber's information, and by which to authenticate the subscriber's privileges of use with the ISP. After that, the outdoor wireless modem 60 is under a regular operation.

In the present example, the baseband module 603 includes a first processing unit 631 and a second processing unit 632 in one module. The first processing unit 631 is used to process the wireless communication signals via the radio-frequency module 601, especially the signals under fourth generation communication protocol. While the operation system 605 converts the wireless network signals to the data packets delivered over a local-area network, the second processing unit 632 then take over the packets. The packets are then forwarded to the local-area network interfacing module 609 in order to deliver the packets over the local-area network 64, which is preferably established under an Ethernet type of local-area network.

Figure 7:
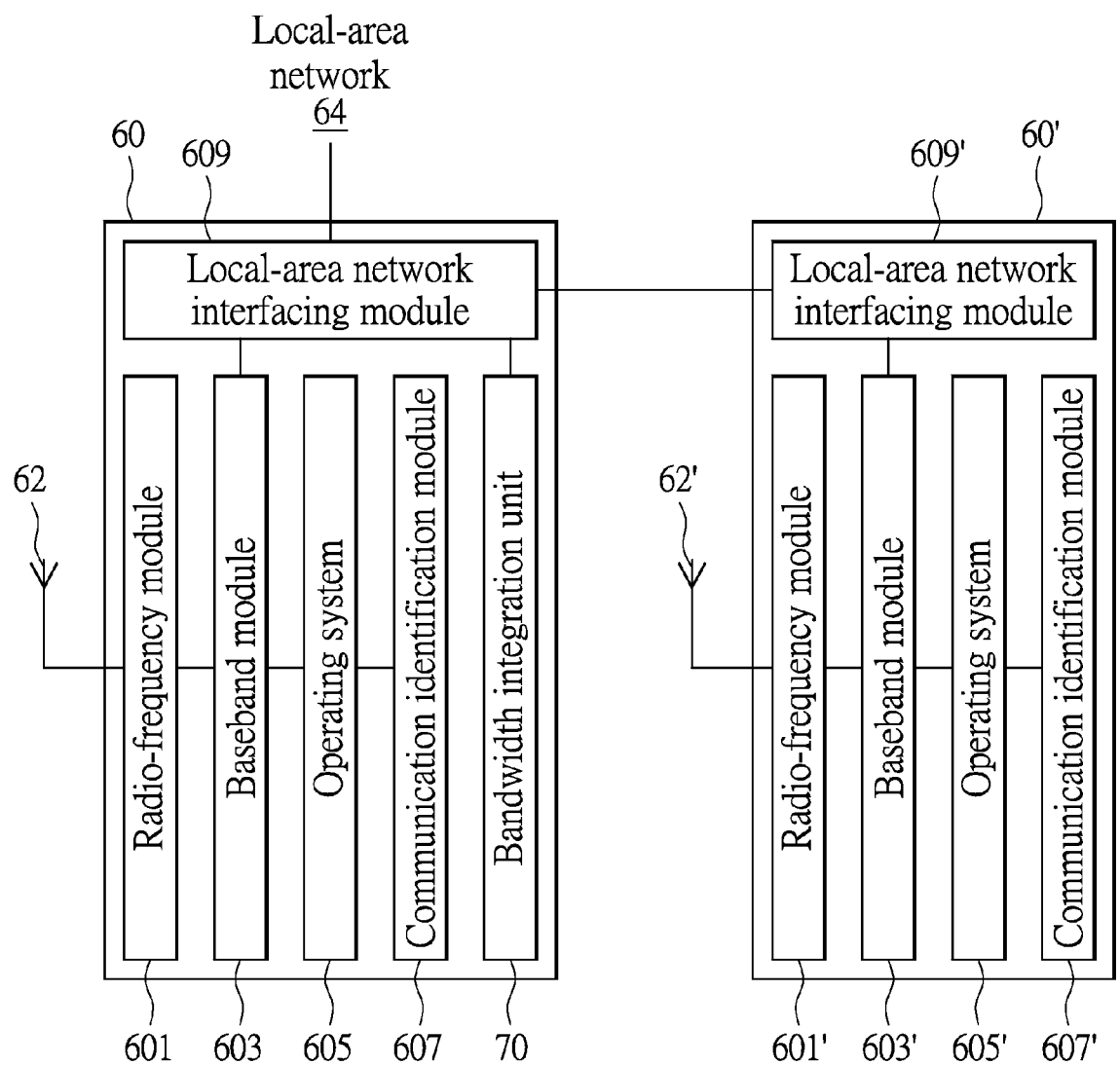
FIG. 7 shows a fourth example of the circuit block of the outdoor wireless modem in one embodiment of the present invention.

In one further embodiment of the present invention, the outdoor wireless modem 60 renders a function of bandwidth integration. Reference is made to FIG. 7 depicting one of the embodiments in the invention. The shown outdoor wireless modem 60 is coupled to another one outdoor wireless modem 60'. This scheme allows the modem 60 simultaneously handling the data packets of two or more different outdoor wireless modems 60, 60' for the purpose of bandwidth integration. The function facilitates bandwidth integration or/and redundancy.

The embodiment shown in the diagram has two outdoor wireless modems 60, 60'. The two local-area network interfacing modules 609, 609' respectively of the two modems 60, 60' are interlinked over a local-area network cable. For example, the cable may be an RJ-45 standard cable for interlinking the two devices via their network connecting ports. The outdoor wireless modem 60 uses one more cable to connect the local-area network 64. The linked two outdoor wireless modems 60, 60' are able to receive the external wireless signals. For the purpose of bandwidth integration, one of the outdoor wireless modems (60 or 60') in this example includes a bandwidth integration unit 70 capable of handling the signals from two different sources. Vice versa, the data packets from the local-area network 64 are delivered to the outdoor wireless modem 60 over the cable. The bandwidth integration unit 70 dispenses the packets to two outdoor wireless modems 60, 60' for achieving load balance.

The bandwidth integration unit 70 is electrically connected to the local-area network interfacing module 609 of the outdoor wireless modem 60. This bandwidth integration unit 70 is able to conduct network address translation (NAT). Since each of the two outdoor wireless modems 60, 60' has two different IP addresses respectively to external and internal network, the bandwidth integration unit 70 is functioned to conduct IP forwarding that turns the packets in one source to different IP addresses. On the other hand, the unit 70 turns the data from different IP addresses to one IP address. The bandwidth integration unit 70 is activated or deactivated based on whether or not another one outdoor wireless modem 60' is existed.

The bandwidth integration unit 70 achieves the mechanism of bandwidth integration or said Link Aggregation. In one exemplary embodiment, the operating system is used to perform a Link Aggregation Control Protocol (IEEE 802.1ax Link Aggregation Control Protocol (LACP)) which combines the links with multiple Ethernet network ports. The bandwidth integration unit 70 combines the data packets from the other outdoor wireless modem (60') through the operating system 605 of the outdoor wireless modem 60 performing the Link Aggregation Control Protocol. It is noted that the bandwidth integration unit operatively connects with two outdoor wireless modems (60, 60') when two respective local-area network interfacing modules (609, 609') are interlined so as to combine the data packets from the two outdoor wireless modems (60, 60').

The Link Aggregation Control Protocol uses one of the lowest layers according to Open System Interconnection Reference Model to conduct the width integration. For example, the physical ports (Layer 1) are combined, and the data link layer (Layer 2) integrates the bandwidth. The data link layer is such as the MAC address for identifying the network port. The width integration may also be implemented over the IP address layer (Layer 3), or over protocol of Internetwork Packet Exchange (IPX). Through one of the layers (L1, L2, L3) according to OSI model, the loads over network may be balanced over multiple connections, or even achieve redundancy. The multiple connections may share one IP address or MAC address to the external network.

Further, the shown outdoor wireless modems 60, 60' are similar devices equipped with the same functions. The modems (60, 60') respectively include antennas 62, 62', radio-frequency modules 601, 601' and baseband modules 603, 603', and each of the baseband modules 603, 603' has two processors such as the mentioned first processing unit and the second processing unit. The modems (60, 60') respectively includes operating systems 605, 605', local-area network interfacing modules 609, 609' and communication identification modules 607, 607'. One of or both the modems 60, 60' includes the bandwidth integration unit 70. The modem having this bandwidth integration unit 70 plays a primary device, and the other one is secondary. In the current example, the primary outdoor wireless modem 60 establishes a connection to the local-area network 64, and the outdoor wireless modem 60' conducts load balance for the same source.

While the two outdoor wireless modems 60, 60' are combined, the two local-area network interfacing modules 609, 609' are interlinked over a cable, and the local-area network interfacing modules 609, 609' are originally linked with the local-area network 64. The primary modem 60 has the bandwidth integration unit 70, and which is the main device bridging the local-area network 64. The mechanical design shows the two outdoor wireless modems 60, 60' are installed nearby and connected via their network connecting ports over a cable. The primary outdoor wireless modem 60 having the bandwidth integration unit 70 uses one more cable to make a link to the local-area network 64.

While the signals enter the modem 60 through the local-area network interfacing module 609 from the local-area network 64, the bandwidth integration unit 70 processes the signals. For example, the bandwidth integration unit 70 may resolve the data packets, reconfigure the header, and divide the packets by a technology of time sharing for the two outdoor wireless modems 60, 60' to send out the signals. The two modems are configured to have the same destination address, and the related packets may be re-combined at the destination.

If signals arrive from external wireless network due to the request sent from the internal device when the request signals have been sent to the source via the two outdoor wireless modems 60, 60', the related signals will be received by two different modems 60, 60'. The signals from the source should be processed and re-combined by the bandwidth integration unit 70. Therefore, it increases the throughput of network traffic.

Figure 8:
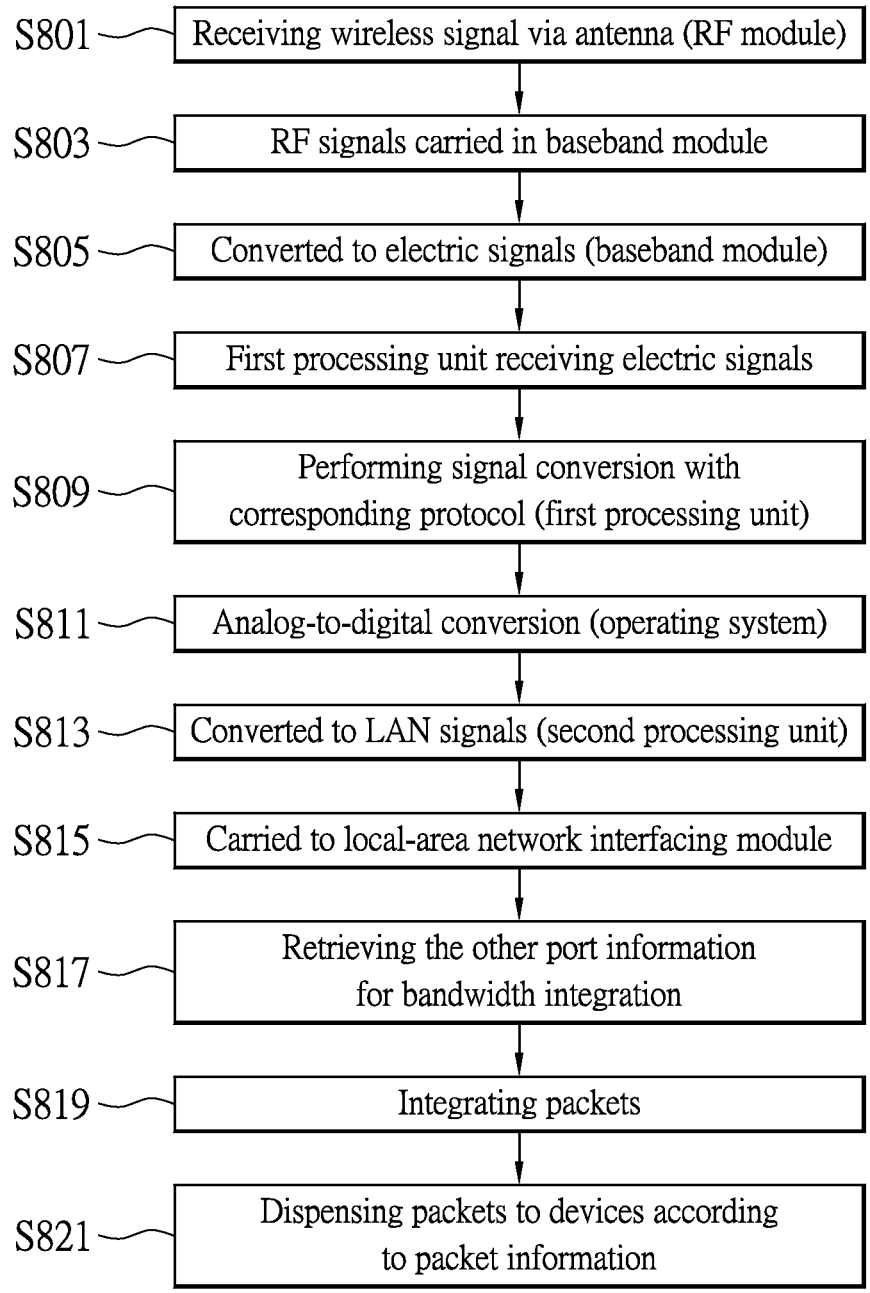
FIG. 8 shows a flow chart illustrating the signal processing method for the outdoor wireless modem in one embodiment of the present invention.

Reference is made to FIG. 8 describing the flow of method for downlink signals according to one embodiment of the present invention.

In step S801, the outdoor wireless modem receives wireless signals via antenna. In particular, the present invention implements the communication over the fourth generation mobile communication network. The radio-frequency module of the outdoor wireless modem handles the network signals, and loads to the baseband module, such as step S803.

The baseband module of the outdoor wireless modem includes a first processing unit and a second processing unit. Step S805 shows the baseband module converts the wireless signals into electric signals as receiving the radio waves. The first processing unit then receives the signals, as step S807, performs signal conversion under a corresponding wireless communication protocol, as step S809.

The outdoor wireless modem is installed with an operating system, which is used to maintain operation of the whole system and signal processing. Such as the step S811, the operating system performs analog-to-digital conversion that converts the electric signals made by radio waves to digital signals. The second processing unit is then responsible for converting the signals to the data packets delivered over the local-area network (step S813).

For example, while the data packets loaded to the local-area network interfacing module, such as step S815, the data packets will be delivered to the other devices linked with the outdoor wireless modem. The device may be a network sharing device disposed within the local-area network, or any other standalone electronic device.

If in one embodiment that two or more outdoor wireless modems are combined, such as step S817, the operating system may firstly acquire the port information of another port for the link combination. The bandwidth integration circuit may then process the signals by integrating the data packets made by the different outdoor wireless modems. For example, the above-mentioned Link Aggregation Control Protocol (LACP) is applied to the scheme of bandwidth integration of the present invention for integrating the packets from the different devices, such as step S819. In step S821, in response to the information of data packets, the packets are dispensed to the devices within the local-area network.

Figure 9:
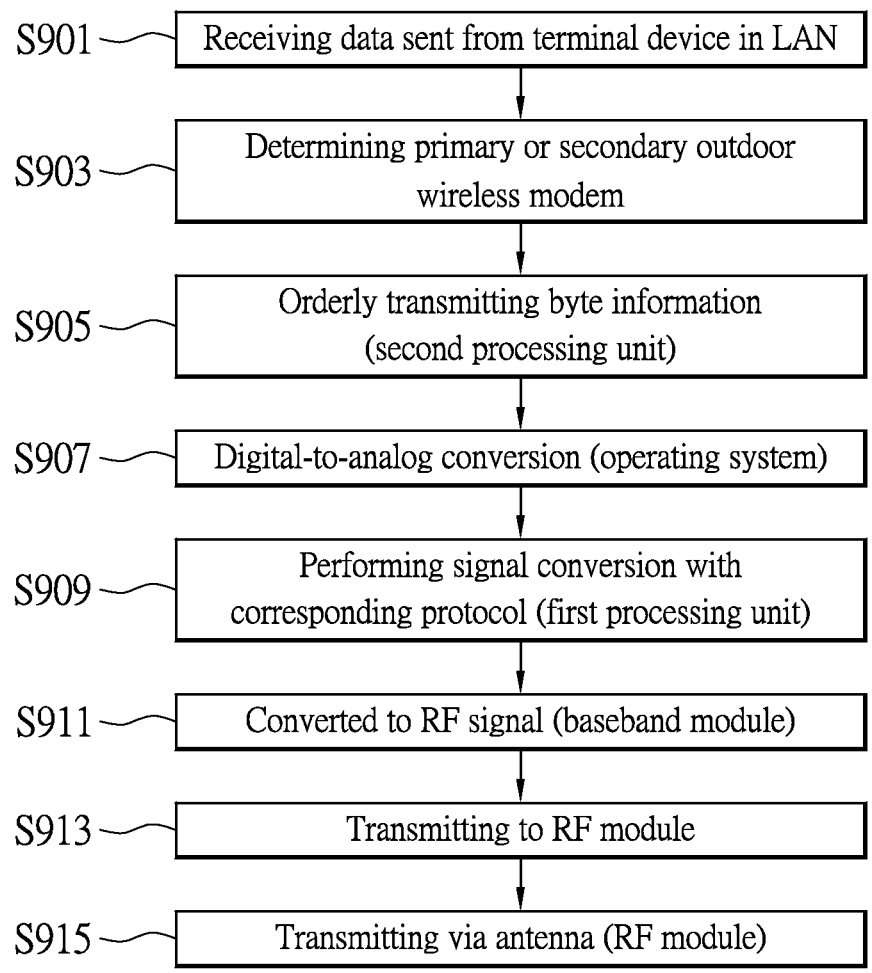
FIG. 9 shows one more flow chart illustrating the signal processing method for the outdoor wireless modem in one further embodiment of the present invention.

The flow chart shown in FIG. 9 describes a uplink process of the outdoor wireless modem in accordance with the present invention. In a first step S901, the outdoor wireless modem connected with the local-area network, or the device combined with the other one outdoor wireless modem receives data sent from a terminal device over the local-area network.

To the embodiment of combining the two outdoor wireless modems, a bandwidth integration unit of the outdoor wireless modem connected with the local-area network, other like circuit, or the software-based solution is used to determine the roles of primary or secondary modem according to the port information of the interlinked ports. The step is referred to step S903.

Next, in step S905, reference is made to the embodiment shown in FIG. 7. Over the signaling uplink route, the primary outdoor wireless modem firstly receives the data packets from the local-area network. The bandwidth integration unit, electrically connected with the local-area network interfacing module, then dispenses the data bit-by-bit by a time-sharing scheme. The data is sequentially sent to the two second processing units of the two outdoor wireless modems. In which, the data is delivered over the connection between the two modems, and sent to the secondary outdoor wireless modem via the local-area network interfacing module thereof. The operating system of each modem performs the digital-to-analog conversion, such as step S907. The converted signals are then loaded to the first processing unit. This first processing unit performs the signal conversion in compliance with a corresponding wireless communication protocol, such as step S909. In step S911, the signals are converted to the radio signals.

While the signals are converted to the signal format in compliance with a specific mobile communication protocol, such as step S913, the signals are sent via an antenna by the radio-frequency module of the outdoor wireless modem, such as step S915.

Over the downlink route, both the primary and secondary outdoor wireless modems respectively receive the wireless signals from a signal source. Via their own radio-frequency module, the modems receive the signals over the mobile communication network. The modems accordingly perform the signal conversion. The operating system of each modem performs analog-to-digital conversion. The baseband module then converts the signals to the data packets delivered over the local-area network. In response to the header information, the bandwidth integration unit re-combines the packets as to the original data. Therefore, bandwidth integration is accomplished.

It is noted that the outdoor wireless modem preferably adopts the fourth generation mobile communication system such as LTE (Long Term Evolution) to provide the wireless network service. The mentioned functionalities may be implemented by a set of circuits or software-based modules. The related circuits include the physical circuits for handling indoor or local signals over the local-area network, and the RF-related modules such as RF module and baseband module as the physical layer (PHY) for processing the outdoor wireless signals. In particular, the baseband module in accordance with the present invention includes two processors respectively in charge of separate jobs. For example, a first processing unit for processing the outdoor wireless signals, and a second processing unit dealing with the packets over local-area network.

To sum up, the outdoor wireless modem is provided for bridging the indoor LAN and the outdoor wireless network. The modem is for the indoor user to get on the WAN over wireless-based backbone directly from his computer equipment. This modem is in charge of routing the packets between the local-area network and wide-area network. The two processors in the baseband circuit are respectively processing the wireless network signals and the LAN packets. The embedded operating system conducts the signal conversion and the packet routing. Through the simplified design of the outdoor wireless modem, it's effectively eliminating the signal interference and reducing the possibility of failures. Therefore, this modem device is suitably disposed outdoor. Furthermore, a bandwidth integration unit is installed in the outdoor wireless modem. Through the bandwidth integration unit, the system achieves load balance or/and bandwidth integration by performing packet division or combination.

It is intended that the specification and depicted embodiment be considered exemplary only, with a true scope and spirit of the invention being indicated by the broad meaning of the following claims.

What is claimed is:

1. An outdoor wireless modem, used to bridge a wide-area network backbone and a local-area network, comprising:
    a radio-frequency module, receiving or transmitting signals over a mobile communication network via an antenna, and the mobile communication network constituting the wide-area network backbone;
    a baseband module, electrically connected with the radio-frequency module, installed with at least two processing circuits respectively processing signals over the mobile communication network and the data packets over the local-area network;
    a local-area network interfacing module, electrically connected with the baseband module, installed with a port connected to the local-area network for forwarding the data packets over the local-area network; and
    a bandwidth integration unit, electrically connected to the local-area network interfacing module, and the outdoor wireless modem connects to another local-area network interfacing module of another outdoor wireless modem via the another local-area network interfacing module; wherein the bandwidth integration unit operatively connects with the two outdoor wireless modems when two respective local-area network interfacing modules are interlinked so as to combine the data packets from the two outdoor wireless modems by an operating system of one of the outdoor wireless modems in compliance with a Link Aggregation Control Protocol.

2. The outdoor wireless modem according to claim 1, wherein the at least two processing circuits includes a first processing unit and a second processing unit packaged into one module, and further a first buffer for buffering data of the first processing unit and a second buffer for buffering data of the second processing unit; wherein the first processing unit is used to process signals over the fourth generation mobile communication network by the radio-frequency module, including signal modulation and decoding/encoding for the signals; the second processing unit is a processor to operate the operating system of the outdoor wireless modem, and to process the data packets transmitted over the local-area network.

3. The outdoor wireless modem according to claim 1, further comprising connected to an indoor bandwidth sharing device, and to the outdoor wireless modem via the port interfacing the local-area network interfacing module.

4. The outdoor wireless modem according to claim 1, wherein one of the outdoor wireless modems is identified as a primary outdoor wireless modem and the other one is identified as a secondary outdoor wireless modem; the local-area network interfacing module of the primary outdoor wireless modem is used to connect with the local-area network, and the bandwidth integration unit is installed in the primary outdoor wireless modem.

5. The outdoor wireless modem according to claim 1, wherein the port is a connecting port with a cable format of RJ-45 or with standard of HomePlug cable.

6. The outdoor wireless modem according to claim 1, further comprising a communication identification module, which is used to identify the outdoor wireless modem.

7. A signal processing method adapted to one or more outdoor wireless modems, comprising:
    in one outdoor wireless modem, a radio-frequency module receiving wireless signals via an antenna, and a baseband module carrying the signals;
    a first processing unit in the baseband module performing signal conversion in compliance with a wireless communication protocol;
    an operating system in the outdoor wireless modem performing an analog-to-digital conversion, and generating digital signals;
    a second processing unit in the baseband module converting the digital signals into the signals delivered over a local-area network, and a local-area network interfacing module carrying the signals;
    dispensing the signals delivered over the local-area network to one or more destinations;
    the local-area network interfacing module acquiring port information of the other outdoor wireless modem when the outdoor wireless modem is linked with one other outdoor wireless modem for performing bandwidth integration;
    performing the bandwidth integration; wherein the outdoor wireless modem is installed with a bandwidth integration unit, by the bandwidth integration unit the local-area network interfacing module acquires the port information of the other outdoor wireless modem for bandwidth integration; and the bandwidth integration unit operatively connects with two outdoor wireless modems when the two respective local-area network interfacing modules are interlinked so as to combine the data packets from the two outdoor wireless modems by the operating system of one of the outdoor wireless modems in compliance with a Link Aggregation Control Protocol.

8. The signal processing method according to claim 7, wherein the outdoor wireless modem activates function of processing wireless signals by a communication identification module.

9. The signal processing method according to claim 7, wherein one of the outdoor wireless modems is identified as a primary outdoor wireless modem and the other one is identified as a secondary outdoor wireless modem; the local-area network interfacing module of the primary outdoor wireless modem is used to connect with the local-area network, and the bandwidth integration unit is installed in the primary outdoor wireless modem.

10. The signal processing method according to claim 9, wherein the each outdoor wireless modem uses its operating system to perform digital-to-analog conversion, which converts the data packets received from the local-area network to the RF signals transmitted by each radio-frequency module of the each outdoor wireless modem over an uplink route.

11. The signal processing method according to claim 9, wherein the each outdoor wireless modem uses its operating system to perform analog-to-digital conversion, which converts the wireless signals received from the source to data packets, after the bandwidth integration, the local-area network interfacing module of the primary outdoor wireless modem transmits the data packets over a downlink route.

12. The signal processing method according to claim 7, wherein the baseband module of each outdoor wireless modem includes at least two process circuits, respectively process the signals transmitted over the mobile communication network and the data packets over the local-area network.

* * * * *